(12) United States Patent
Biswal et al.

(10) Patent No.: US 10,183,614 B1
(45) Date of Patent: Jan. 22, 2019

(54) SYSTEM AND METHOD FOR VEHICLE HEADLIGHT CONTROL

(71) Applicant: Harman International Industries, Incorporated, Stamford, CT (US)

(72) Inventors: Rajesh Biswal, Bangalore (IN); Srinivas Sai, Bangalore (IN); Pratyush Sahay, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/680,150

(22) Filed: Aug. 17, 2017

(51) Int. Cl.
*H05B 37/02* (2006.01)
*B60Q 1/14* (2006.01)

(52) U.S. Cl.
CPC .................... *B60Q 1/143* (2013.01)

(58) Field of Classification Search
CPC .. H05B 37/02; H05B 37/029; H05B 37/0227; H05B 37/0272; H04N 7/181; H04N 5/2354; H04N 5/23254; H04N 5/33; G01S 13/867
See application file for complete search history.

(56) References Cited

U.S. PATENT DOCUMENTS

| | | | | |
|---|---|---|---|---|
| 8,992,056 B2* | 3/2015 | Lin | ................ | B60Q 1/12 362/464 |
| 9,191,574 B2* | 11/2015 | McMahon | ............. | H04N 7/181 |
| 9,497,393 B2* | 11/2016 | Reed | ................ | H05B 37/0227 |
| 9,629,220 B2* | 4/2017 | Panopoulos | ....... | H05B 37/0209 |
| 2017/0270375 A1* | 9/2017 | Grauer | ............... | G06K 9/00805 |

* cited by examiner

*Primary Examiner* — Haissa Philogene
(74) *Attorney, Agent, or Firm* — Gordon & Rees LLP

(57) ABSTRACT

The present disclosure relates to systems, devices and methods for vehicle headlight control. In one embodiment, a method includes receiving image data from a front facing camera of the vehicle and detecting at least one object in the image data. An illumination level of the at least one object in the image data is detected and a control setting is determined to modify illumination of at least one lighting element of the vehicle, wherein the control setting is determined to increase an illumination level for the at least one object. The method also includes controlling the at least one lighting element of the vehicle in response to the control setting. Vehicle systems and devices are provided with a front facing camera and a control unit for a plurality of lighting elements wherein control settings may be modified based on objects detected in image data.

20 Claims, 7 Drawing Sheets

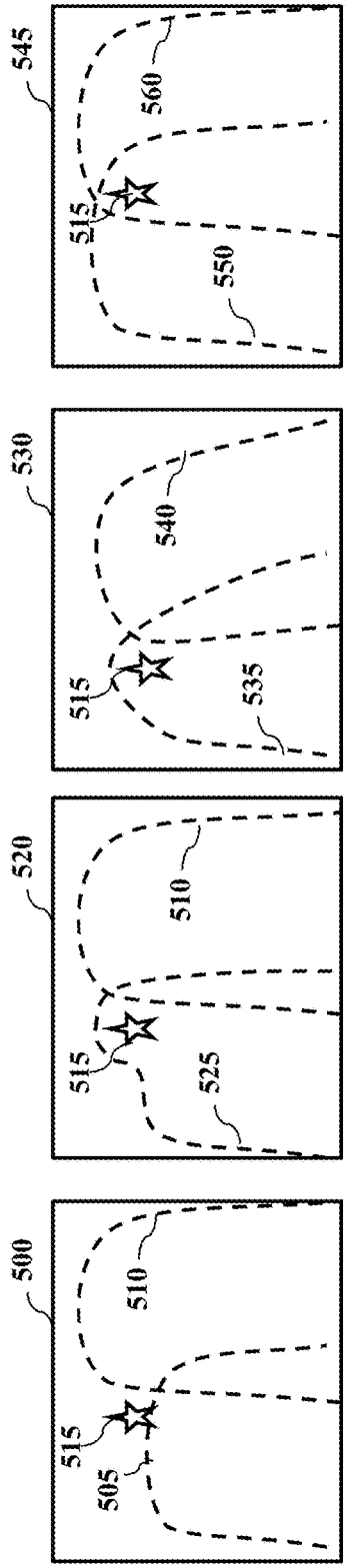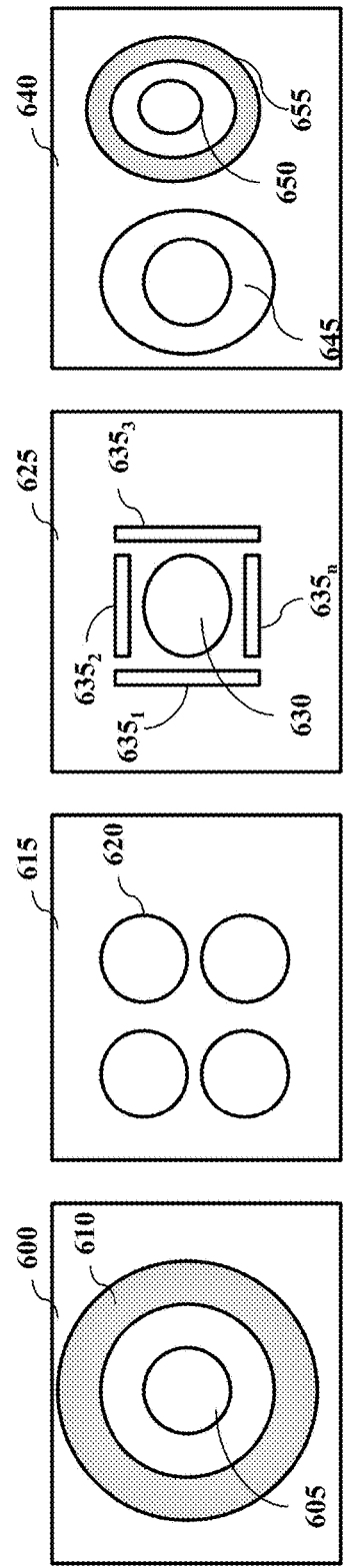

SYSTEM AND METHOD FOR VEHICLE HEADLIGHT CONTROL

FIELD

The present disclosure relates to vehicle systems and control methods, and more particularly to processes and configurations for intelligent vehicle headlight control using a front facing camera.

BACKGROUND

Safe operation of a vehicle is a primary concern for many vehicle operators. As such, technical developments have been directed to systems focused on accident prevention and safe operation. Advances in technology have led to assistance systems that provide alerts and improve field of view. Despite the development of such systems there exists a need and a desire for improved driver assistance during low and/or diminished visibility situations.

Conventional headlamp control exists for switching vehicle headlamps from a high beam to a low beam setting when oncoming vehicles are detected. Another existing technology relates to adaptive headlight systems that include directional headlight aiming based on road curvature or a vehicle turning. These systems allow for the direction of headlamps to be controlled based on road curvature or vehicle turning. These systems result in a low beam pattern that does not account for objects detected in front of the vehicle. There is a desire for headlight control that improves illumination of objects within an operators field of view. In addition there exists a need for a technology that does not require activation of high beam elements which could blind pedestrians and/or oncoming traffic. Although existing high beam systems allow for flooding objects in front of a vehicle with light, it is often difficult for a driver to detect objects due to the brightness of the high beams. Similarly, oncoming or leading vehicles may be adversely affected due to high beams.

There exists a desire for driver assist systems to improve control of lighting elements.

BRIEF SUMMARY OF THE EMBODIMENTS

Disclosed and claimed herein are methods, devices and systems for vehicle headlight control. One embodiment is directed to a method including receiving, by a control unit, image data from a front facing camera of the vehicle, and detecting, by the control unit, at least one object in the image data. The method also includes detecting, by the control unit, an illumination level of the at least one object in the image data, and determining, by the control unit, a control setting to modify illumination of at least one lighting element of the vehicle, wherein the control setting is determined to increase an illumination level for the at least one object. The method also includes controlling, by the control unit, the least one lighting element of the vehicle in response to the control setting.

In one embodiment, the image data is video data captured for a scene associated with the direction of travel of the vehicle.

In one embodiment, the at least one object includes one or more of a pedestrian, vehicle, barrier, person, roadway hazard, and roadway object.

In one embodiment, the illumination level relates to one or more of brightness and light distribution.

In one embodiment, the illumination level relates to object brightness in the image data.

In one embodiment, the control setting modifies the angular position and direction of the at least one lighting element.

In one embodiment, the control setting modifies brightness and illumination activation of the at least one lighting element.

In one embodiment, controlling includes adjusting direction of the at least one lighting element of the vehicle.

In one embodiment, controlling includes activation of one or more illumination sources of vehicle lighting elements.

In one embodiment, the control setting relates to illumination of a section of capture image data and controlling includes control of one or more vehicle lighting elements to increase brightness for the section of captured image data.

Another embodiment is directed to a vehicle system including a plurality of lighting elements, a front facing camera and a control unit for the plurality of lighting elements. The control unit is configured to receive image data from a front facing camera of the vehicle and detecting at least one object in the image data. The control unit is also configured to detect an illumination level of the at least one object in the image data. The control unit is also configured to determine a control setting to modify an illumination output for at least one lighting element of the vehicle, wherein the control setting is determined to increase an illumination level for the at least one object. The control unit is also configured to control the least one lighting element of the vehicle in response to the control setting.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 5A-5D depict graphical representations of lighting element control according to one or more embodiments;

FIG. 6A-6D depict graphical representations of lighting elements according to one or more embodiments;

DETAILED DESCRIPTION OF THE EXEMPLARY EMBODIMENTS

Overview and Terminology

Figure 1:
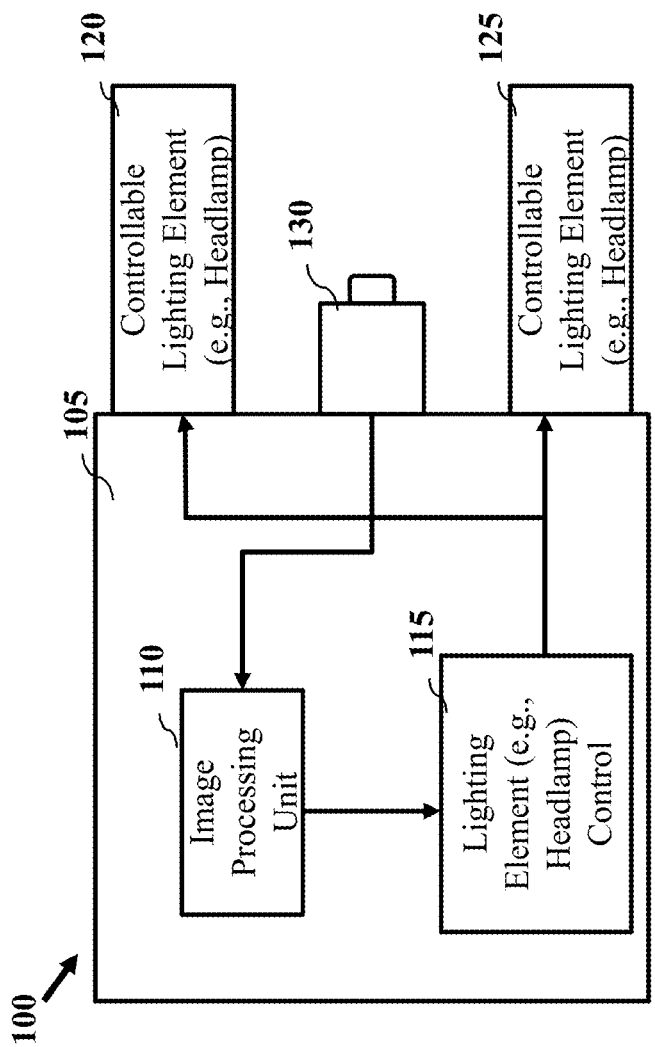
FIG. 1 depicts a graphical representation of a system for vehicle headlight control according to one or more embodiments.

One aspect of the disclosure is directed to processes and configurations for controlling illumination elements of a vehicle. In one embodiment, a vehicle system is provided including a front facing camera configured to detect image data associated with a direction of travel of the vehicle. The vehicle system may detect objects in the image data and control one or more lighting elements of the vehicle based on detected objects. The vehicle system is configured to improve overall visibility of "objects of interest" in low light conditions by controlling the lighting elements (e.g., front headlamps/exterior lights) of the vehicle. In one embodiment, video imaging devices (e.g., RGB cameras) may be employed by a control unit to generate decisions for controlling the headlamps.

Another embodiment is directed to processes for vehicle headlight control that include detecting illumination levels of at least one object in image data and controlling at least one lighting element to increase illumination of objects. The process may include image analysis to allow for object detection and determination of one or more control parameters.

Processes and system configurations described herein can prevent blinding of other vehicle drivers, such as oncoming vehicle or leading vehicles. In addition, alerts may be provided for potential objects (e.g., pedestrians, animals, hazards, etc.) in the drive path. Processes and system configurations described herein can also overcome disadvantages of existing systems. For example, the processes and systems described herein improve the visibility for the driver to identify objects like cyclists, pedestrians, animals, pot holes, traffic signals, etc. In addition, processes and systems described herein do not require thermal cameras to detect objects (e.g. pedestrians) in low light, as thermal cameras may not work well in hot climate conditions.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a graphical representation of a system for vehicle headlight control according to one or more embodiments. In one embodiment, system 100 is a part of a vehicle system for control of one of more lighting elements of the vehicle. System 100 may be employed by multiple types of motorized vehicles, including two (2) wheel vehicles, four (4) wheel vehicles, and vehicles in general. According to one embodiment, and as depicted in FIG. 1, system 100 is configured to control multiple lighting elements. However, in certain embodiments system 100 may be provided for a single lighting element.

According to one embodiment, system 100 includes control unit 105, controllable lighting elements 120 and 125, and front facing camera 130. Control unit 105 is configured to control one or more lighting elements of a vehicle. Control unit 105 includes an image processing unit 110 and lighting element control unit 115. In one embodiment, control unit 105 is a device module of the vehicle which may be interface with one or more components of the vehicle. In other embodiments, control unit 105 may be provided as part of a vehicle system, such as part of the vehicle onboard control system, vehicle assistive driving system and/or part of a vehicles infotainment system. In certain embodiments, image processing unit 110 and lighting element control unit 115 may be physical device components. In other embodiments, functions and operation of image processing unit 110 and lighting element control unit 115 may relate to software modules performed by a processer of the vehicle. Control unit 105 is electrically connected to controllable lighting elements 120 and 125, and front facing camera 130. According to one embodiment, control unit 105 is configured to control one or more of the direction, illumination, brightness and operation in general of controllable lighting elements 120 and 125. Control unit 105 is also configured to receive image data from front facing camera 130.

According to one embodiment, controllable lighting elements 120 and 125 each relate to a lighting element configured to receive control signals to direction light output and each include a plurality of lighting elements that may be selectively activated within one or more brightness levels by control unit 105. In one embodiment, controllable lighting elements 120 and 125 are each front facing vehicle headlights placed at different positions of the vehicle (e.g., front passenger side and front driver side). As such, controllable lighting elements 120 and 125 each include their own housing and control units. In other embodiment embodiments, controllable lighting elements 120 and 125 may be collocated (e.g., motorcycle headlights) wherein each lighting element may be separately controlled. Controllable lighting elements 120 and 125 may each be configured to provide two (2) degrees of freedom to allow for horizontal and vertical position of an emitted light beam or beams.

According to one embodiment, controllable lighting elements 120 and 125 have multiple light settings, including a low beam pattern and a high beam pattern. In addition, controllable lighting elements 120 and 125 may be configured to modify the low beam and high beam patterns. In certain embodiments, the low beam and high beam patterns may be modified to change the position of a lighting element resulting in a change in direction of an output beam. In other embodiments, the low beam and high beam patterns may be modified by changing at least one of a direction and activation of illumination sources of a lighting element. Modifications may be determined as needed based on objects detected by a front facing camera. In other embodiments, modifications may be based on preset configurations for lighting elements.

Front facing camera 130 relates to a front facing automotive camera, such providing video image data (e.g., red green blue (RGB) video data). In one embodiment a single camera 130 is deployed. In other embodiments, multiple cameras may be employed by system 100. Image processing unit 110 is configured to receive raw video feed from front facing camera 130. As will be discussed in more detail below, image data from front facing camera 130 may be employed to control the position, illumination and/or brightness of controllable lighting elements 120 and 125. By way of example, image processing unit 110 may be configured to detect one or more objects in the image data which require additional illumination from controllable lighting elements 120 and 125. Image processing unit 110 and lighting element control unit 115 may determine one of more control settings for controllable lighting elements 120 and 125. In one embodiment, control settings may be modified to increase illumination of objects detected in image data produced by front facing camera 130. In other embodiments, control settings may be modified to change illumination patterns based on image data produced by front facing camera 130. Lighting element control unit 115 may be a control unit configured to control the horizontal/vertical motion of one or more lighting elements (e.g., headlamps) to optimize visibility and improve driver detection of objects based on object type and location.

According to one embodiment, image processing unit 110 is configured to detect objects from image data. By way of example, image processing unit 110 receives a raw camera feed from front facing camera 130 and outputs object type (e.g., pedestrian, animal, pot holes, curbs, cyclists, etc.). Image processing unit 110 can also determine and output an objects 3D location with respect to front facing camera 130. In certain embodiments, image processing unit 110 utilizes a deep learning process for object detection.

Figure 7:
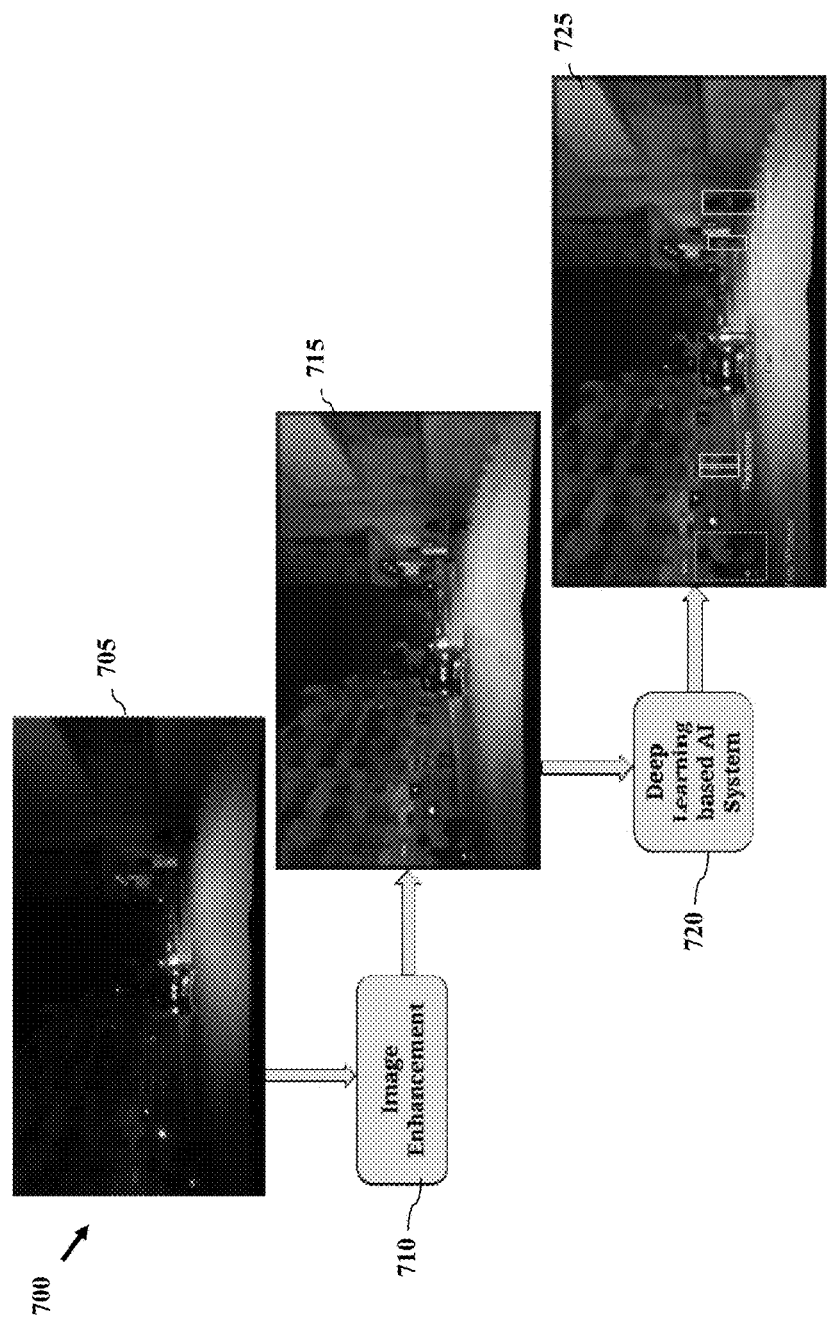
FIG. 7 depicts a graphical representation of image data and control unit processes according to one or more embodiments.

According to one embodiment, image processing unit 110 obtains a video feed from front facing camera 130 in real-time, processes the image data to improve visibility using an image enhancement block and forwards it to an AI (artificial intelligence) system for analysis. The AI system primarily comprises of "Deep Learning" algorithms which process the video in their raw RGB format by performing a series of non-linear transformations. Each such transformation is mathematically implemented in the form of a computational layer, such as a Convolutional Layer, Fully-Connected Layer, etc. Several sets of such non-linear transformations of the data finally results in the detection of various objects in the scene, their approximate spatial locations and relative importance. Process 700 of FIG. 7 is discussed below and addresses application of deep learning with lighting element control.

Figure 2:
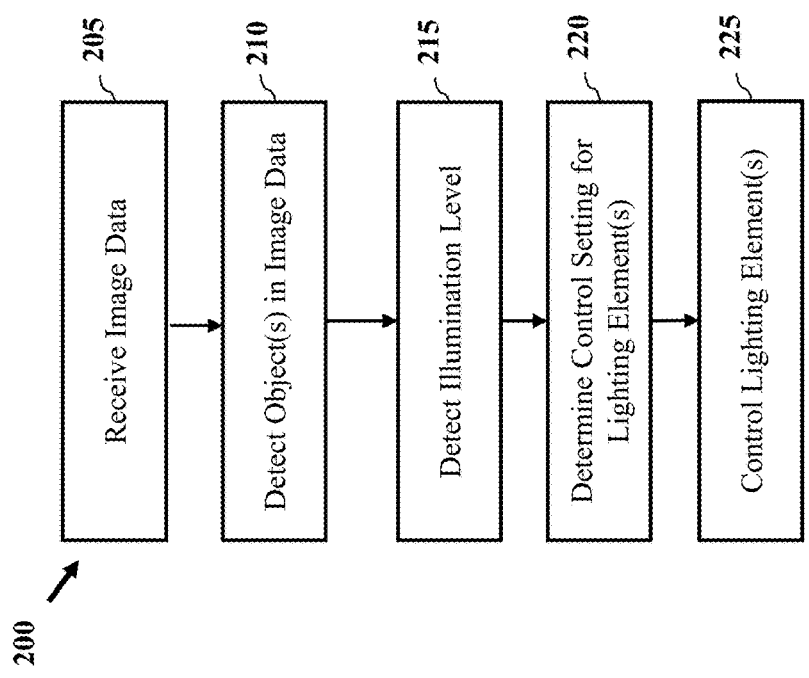
FIG. 2 depicts a process for vehicle headlight control according to one or more embodiments.

FIG. 2 depicts a process for vehicle headlight control according to one or more embodiments. Process 200 may be employed by a device, such as a control unit (e.g., control unit 105) of a vehicle system (e.g., system 100) and one or more other components to control lighting elements of the vehicle. According to one embodiment, process 200 may be initiated by the control unit of the vehicle system (e.g., driver assist system) receiving image data at block 205. Image data received at block 205 may represent an outside of a vehicle, such as a front facing direction of travel. In one embodiment, image data is video data captured for a scene associated with the direction of travel of the vehicle. Process 200 may be directed to a single frame or multiple frames of the received image data. In some embodiments, multiple frames may be processed concurrently to provide a real time display of detected objects.

At block 210, process 200 includes detection of at least one object in the image data. An image processing unit (e.g., image processing unit 110) processes image data to identify elements in the image data. According to one embodiment, the image processing unit is configured to detect at least one of a pedestrian, vehicle, barrier, person, roadway hazard, and roadway object as objects. Process 200 may use one or more means for object identification in image data including comparison of one or more image frames, feature matching, edge detection and object identification algorithms. At block 210, process 200 may also perform one or more learning operations based on object identification as will be discussed below in more detail.

According to one embodiment, object detection at block 210 includes determining object position in three dimensional (3D) space. By way of example, objects may be identified with respect to their location in received image data and with respect to distance from a front facing camera of the vehicle. One or more characteristics of the object, such as distance, height, size, etc. and characteristics of the vehicle, such as speed, acceleration, etc., may be used to determine control settings for lighting elements. Distance of the object relative the vehicle may affect the amount of displacement and number of illumination elements activated.

At block 215, process 200 includes detecting an illumination level of at least one object in the image data. Illumination level relates to one or more of brightness and light distribution. Illumination level relates to object brightness in the image data. Illumination level may be for the current light settings of a vehicle. A vehicle have multiple light settings.

At block 220, process 200 includes determining a control setting to modify illumination of at least one lighting element of the vehicle. The control setting is determined to increase an illumination level for the at least one object. In one embodiment, the control setting modifies the angular position and direction of the at least one lighting element. According to another embodiment, the control setting modifies brightness and illumination activation of the at least one lighting element. Control settings can include commands for mechanical position and/or lighting of different elements, such as different modes, different light sections. In certain embodiments, control settings are based on image data luminance, such that brightness level determined for objects or sections of the image are improved. In this fashion, the amount of light detected in the area of an object may correlate with the amount a beam pattern or beam patterns illuminate an object. According to another embodiment, control settings are based on identifying objects position relative to image detector detection area, controlling light to capture areas of image detected. For example, the image detection area may be divided into sections (e.g., grid, non-grid areas) that may be correlated with three-dimensional space and distance from the vehicle.

At block 225, process 200 includes controlling the least one lighting element of the vehicle in response to the control setting. Controlling can include adjusting direction of the at least one lighting element of the vehicle. Alternatively or in combination, controlling includes activation of one or more illumination sources of vehicle lighting elements. Control settings can relate to illumination of a section of capture image data and controlling includes control of one or more vehicle lighting elements to increase brightness for the section of captured image data.

Figure 3:
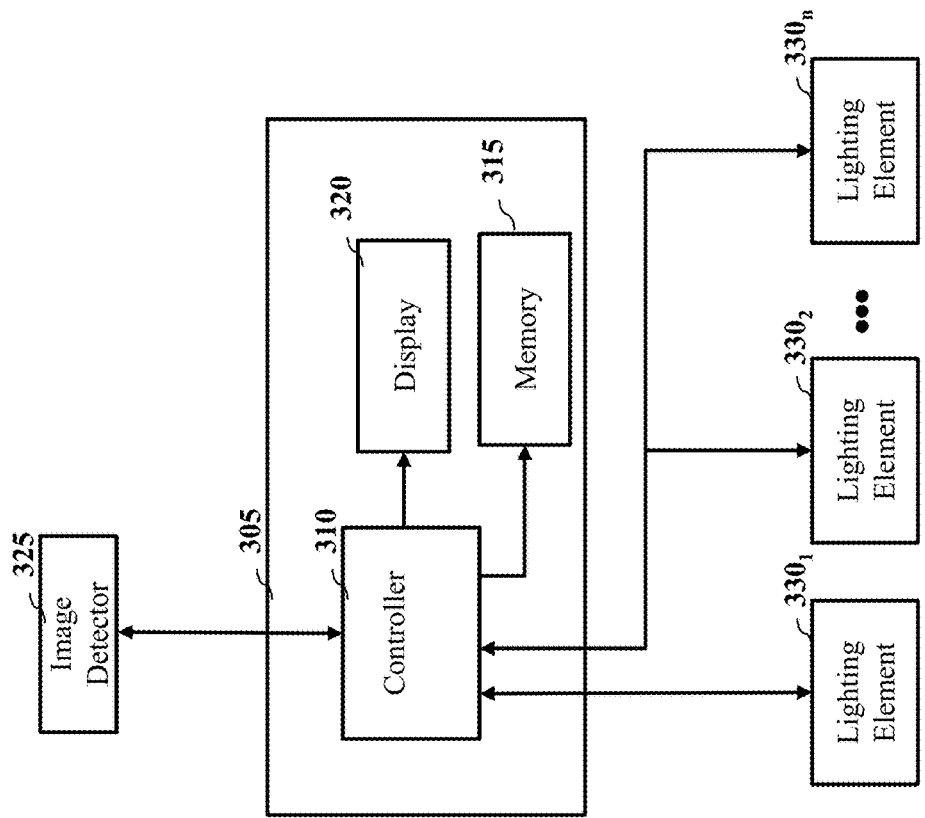
FIG. 3 depicts a diagram of vehicle elements according to one or more embodiments.

FIG. 3 depicts diagram of vehicle elements according to one or more other embodiments. Control unit 305 may be configured to receive image data, control lighting elements and display notifications for one or more detected objects. Control unit 305 includes controller 310, memory 315 and display 320.

Control unit 305 may be configured to receive image data from image detector 325 which may be a front facing camera of the vehicle. Based on received image data one or more control commands may be output by control unit 305 to lighting elements $330_{1-n}$. In one embodiment, control commands relate to position of lighting elements $330_{1-n}$ such that the direction of each light element may be controlled. According to another embodiment, the illumination settings of each of lighting elements $330_{1-n}$ may be controlled by control unit 305.

Control unit 305 may be part of infotainment system or driver assistance system of a vehicle and can display 320 to present image data including one or more graphical elements or notifications for detected objects. According to one embodiment, display 320 is configured to display image data received from image detector 325. Memory 315 includes non-transitory memory such as RAM and ROM memory. Memory 315 may be configured to store executable instructions for operation of controller 310.

Control unit 305 is configured to control a plurality of lighting elements. In certain embodiments, lighting elements $330_{1-n}$ may include at least two front facing headlights of a vehicle. According to another embodiment, each headlight unit of the vehicle may include multiple lighting elements.

Figure 4A:
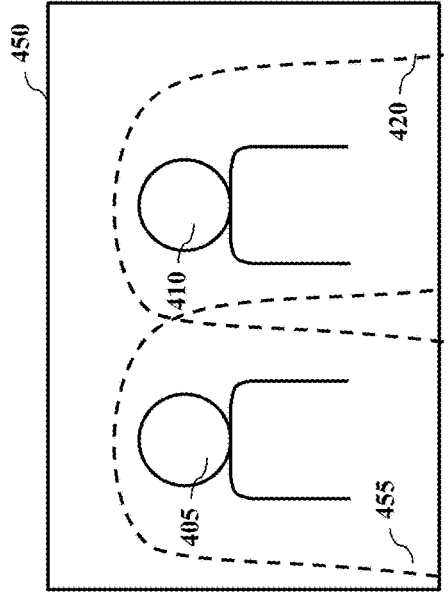
FIGS. 4A-4D depicts graphical representations of headlight control according to one or more embodiments.

FIGS. 4A-4D depicts graphical representations of headlight control according to one or more embodiments. Referring first to FIG. 4A, scene 400 relates to image data captured from an image detector or front facing camera of a vehicle (e.g., front facing camera 130). According to one embodiment, scene 400 may relate to a portion of the data captured. According to another embodiment, scene 400 may be associated with a display range of a vehicle display configured to present notifications for detected objects and image data.

According to one embodiment, scene 400 includes objects 405 and 410 representing people present in the detection area of the image detector. Although objects are depicted as people in FIGS. 4A-4D, it should be appreciated that other types of objects may be detected. Scene 400 also includes lighting element outputs 415 and 420 representing illumination areas of controllable lighting elements 120 and 125 or a vehicle. Lighting element outputs 415 and 420 may represent a low beam pattern provide a distribution of light designed to provide adequate forward and lateral illumination, with limits on light directed towards the eyes of other road users to control glare.

According to one embodiment, scene 400 depicts image data and lighting element output prior to adjustment or detection of objects. For example, scene 400 may relate to a low beam setting for lighting element. In addition, the low beam setting may be output prior to detection of objects 405 and 410. Objects 405 and 410 may be detected by a control unit. The control unit may then modify one or more settings of controllable lighting elements.

Figure 4B:
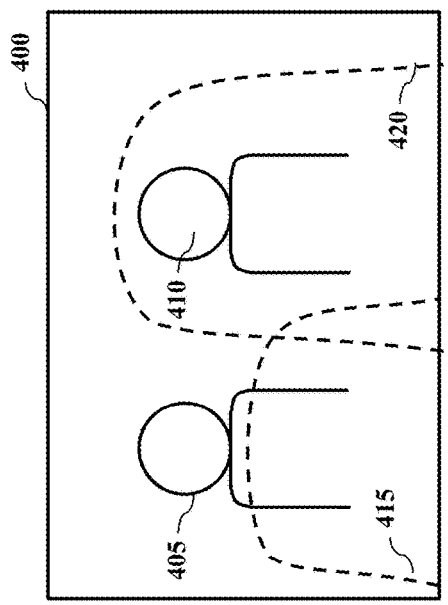

Referring now to FIG. 4B, scene 450 relates to image data captured from an image detector or front facing camera of a vehicle where one or more lighting elements are controlled to modify illumination output. According to one embodiment, scene 450 includes objects 405 and 410 and lighting element outputs 455 and 420 representing illumination areas of controllable lighting elements 120 and 125 or a vehicle. According to one embodiment, a control unit is configured to modify illumination settings of one or more of the lighting elements such that output 415 is modified to output 455. According to one embodiment, modifying of a lighting element may relate to a directional change. According to another embodiment, modification of a lighting element output relates to changing an illumination setting. In yet another embodiment, modifying an illumination output relates to one or more of control of direction, illumination strength, and selection activation of illumination elements. Accordingly, in some embodiments, output 455 may relate to modifying output of a single controllable lighting element based on direction of the lighting element light sources and one control of the lighting element light sources. As will be discussed in more detail below with respect to FIG. 5, the beam pattern of lighting elements may be modified based on a control setting to produce output 455. Lighting element outputs 455 and 420 may represent a low beam pattern provide a distribution of light designed to provide adequate forward and lateral illumination, with limits on light directed towards the eyes of other road users to control glare. Lighting element outputs 455 and 420 may be different from a high beam (main beam, driving beam, full beam) headlamps provide a bright, centre-weighted distribution of light in that the light outputs 455 and 420 may be generated using main driving beam elements.

Figure 4C:
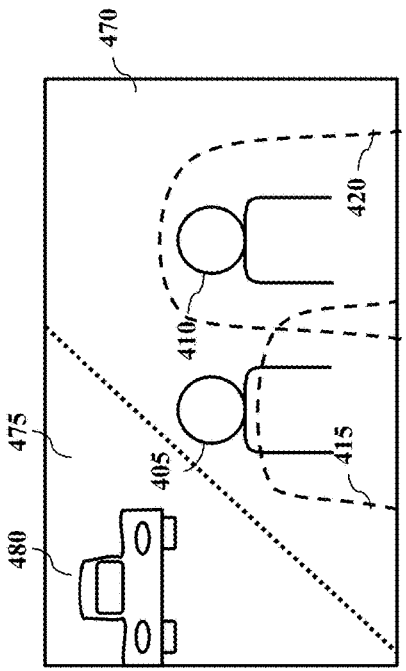

Referring now to FIG. 4C, scene 460 relates to image data captured from an image detector or front facing camera of a vehicle with grid elements 461 included for illustration purposes. According to one embodiment, an image processing unit or control unit is configured to detect objects 405 and 410 and outputs 415 and 420 from image data. Based on the objects, object position and illumination of the objects in the scene, the control unit can determine which sections of the screen require additional illumination for an object. According to one embodiment, a control unit may detect areas 465 and 470 of grid elements 461 as being associated with detected object 405 which requires additional illumination. In certain embodiments, lighting element outputs may be configured based on a detection area of an imaging device, such that the grid elements or sections of the image data are associated with preconfigured lighting element settings.

Figure 4D:
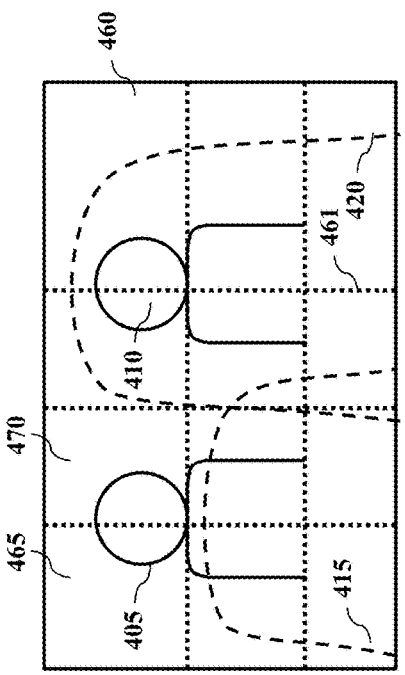

Referring now to FIG. 4D, scene 470 relates to image data captured from an image detector or front facing camera of a vehicle. According to one embodiment, an image processing unit or control unit is configured to detect objects 405 and 410 and light element outputs 415 and 420 from image data. In some embodiments, image data received by the control unit includes elements from another lane or area near the path of the vehicle. Scene 470 includes a nearby lane 475 including vehicle 480 which may be associated with the same direction of travel or an opposite direction of travel of the vehicle. According to one embodiment, a control unit may be configured to recognize lane 475 and vehicle 480 based on detected image data. In addition, the control unit may be configured to modify light element outputs 415 and 420 to account for lane 475 and vehicle 480 such that the light output is not projected to blind oncoming traffic. Accordingly, a control unit may modify output 415 to one or more additional illumination levels to settings which accounts for nearby lanes and/or oncoming traffic.

FIGS. 5A-5D depict graphical representations of lighting element control according to one or more embodiments. FIG. 5A depicts beam pattern 500 which relates to a beam pattern output including lighting element outputs 505 and 510 representing illumination areas form one or more lighting elements, such as controllable lighting elements 120 and 125. According to one embodiment, beam pattern 500 may relate to a low beam setting for lighting elements of a vehicle. In certain embodiments, the initial output of headlights may relate to a low beam, or high beam output based on settings or controls available to the user. For example, vehicle settings may allow for setting vehicle lights in one or more of an off position, automatic position, parking light setting (e.g., headlights off, safety lights on), high beam setting and adaptive setting.

Object 515 is depicted as FIG. 5A relative to element outputs. According to one embodiment, a standard or initial output for lighting elements may require modification for objects detected using image data from a front facing camera, such as object 515. Based on detection of object 515, a control unit may control one or more lighting elements.

Beam pattern 500 relates to a beam pattern output including lighting element outputs 505 and 510 representing illumination areas form one or more lighting elements, FIG. 5B depicts beam pattern 520 which relates to a beam pattern output including lighting element outputs 525 and 510. Beam pattern 520 may be generated in response to detection of object 515. According to one embodiment a control unit may be configured to control a lighting element, such as the lighting element generating output 525 to allow for illumination of object 515 based on one or more of adjusting the direction of the lighting element, activation of one or more illumination sources of the lighting element, controlling illumination output patterns and controlling illumination brightness. According to one embodiment, output 525 is similar to output 505, with the addition of an expanded illumination area to illumination object 515.

FIG. 5C depicts beam pattern 530 which relates to a beam pattern output including lighting element outputs 535 and 540. Beam pattern 530 may be generated in response to detection of object 515. According to one embodiment a control unit may be configured to control a lighting element, such as the lighting element generating output 535 to allow for illumination of object 515 based on one or more of adjusting the direction of the lighting element, activation of one or more illumination sources of the lighting element, controlling illumination output patterns and controlling illumination brightness. According to one embodiment, output 535 is similar to output 505, wherein output 535 is generated by rotating a lighting element. According to another embodiment, output 540 may be similarly generated by rotating an illumination output. In that fashion object 515 may be illuminated while still rotated to with the addition of an expanded illumination area to illumination object 515.

FIG. 5D depicts beam pattern 545 which relates to a beam pattern output including lighting element outputs 550 and 560. Beam patterns 550 and 560 may be generated in response to detection of object 515. According to one embodiment a control unit may be configured to control lighting elements to allow for illumination of object 515 by expanding the limitation area of output 505 and 510 to outputs 550 and 560. As shown in FIG. 5D, outputs 550 and 560 both illumination object 515. According to one embodiment, outputs 550 and 560 may be generated without increasing brightness (e.g., not turning on high beams). For example the direction of the light elements may be modified to adequately illuminate objects.

FIGS. 6A-6D depict graphical representations of lighting elements according to one or more embodiments. According to one embodiment, one or more lighting element configurations may be employed. In addition, light element configurations described below are exemplary and may include additional or fewer elements in certain embodiments. Each illumination source in FIGS. 6A-6D may include one or more light output elements, e.g., bulbs, light emitting diodes (LEDs), etc. Although illumination sources may be shown as having a circular or rectangular shape in FIGS. 6A-6D, it may be appreciated that illumination elements may include other shapes or profiles.

FIG. 6A depicts lighting element 600 including inner illumination source 605 and outer illumination source 610. Inner illumination source 605 is depicted as a circular element within outer illumination source 610 which includes an outer ring or one or more light sources.

FIG. 6B depicts lighting element 615 including multiple illumination sources 620 arranged in rectangular pattern within each illumination source have a circular shape. One or more of illumination sources 620 may be activated by a control unit to direct the illumination beam produced by lighting element 615.

FIG. 6C depicts lighting element 625 including inner illumination source 630 and outer illumination sources 635$_{1-n}$. Inner illumination source 630 is depicted as a circular element within outer illumination sources 635$_{1-n}$ which include four (4) rectangular elements surrounding inner illumination source 630. One or more of illumination sources 630 and 635$_{1-n}$ may be activated by a control unit to direct the illumination beam produced by lighting element 625.

FIG. 6D depicts lighting element 640 including illumination source 645, illumination source 650, and illumination source 655. Illumination source 645 and illumination source 655 are depicted as circular elements. Illumination source 650 is depicted as an inner element within illumination source 655.

FIG. 7 depicts a graphical representation of image data and control unit processes according to one or more embodiments. Process 700 may relate to operation of an image processing unit according to one or more embodiments. Process 700 may be initiated by receiving image data 705. Image data 705 may relate to raw image data extracted from the video feed provided by a front facing camera of a vehicle. According to one embodiment, the image processing unit performs image enhancement at block 710 to generate modified image data 715.

According to one embodiment, modified image data 715 may be employed by one or more deep learning based artificial intelligence algorithms at block 720 to identify objects and present output image data 725 including one or more objects identified by graphical elements. Deep learning at block 720 may be trained to recognize various commonplace objects in a driving scenario. Training can employ data to recognize objects in image data while driving.

According to one embodiment, the deep learning at block 720 may employ a neural network including multiple layers which process portions of inverted and enhanced image data to analyze image frames and perform machine learning of image content. Machine learning at block 720 can include at least one of comparing pixel data and comparing frames of modified image data 715 to distinguish objects. Other functions and capabilities at block 720 can include a convolution neural network to mine collections of images including overlapping regions. A regression layer may be applied to the collections of images to improve quality of video frames and better identify objects, such as a roadway, and portions of the image.

Output image data 725 may include a display of graphical elements as an indication of objects and their position in the image data. In one embodiment, a rectangular outline or bounding box for detected objects is presented in output image data 725. The bounding boxes may be added to image 715 to form image 725 with bounding boxes (e.g., colored boxes, graphical elements, etc.) to indicate detected objects. According to one embodiment, luminance levels of one or more of image data 705 and image data 715 may be detected by a control unit and/or deep learning processes at block 720 for control of one or more lighting elements.

Figure 8:
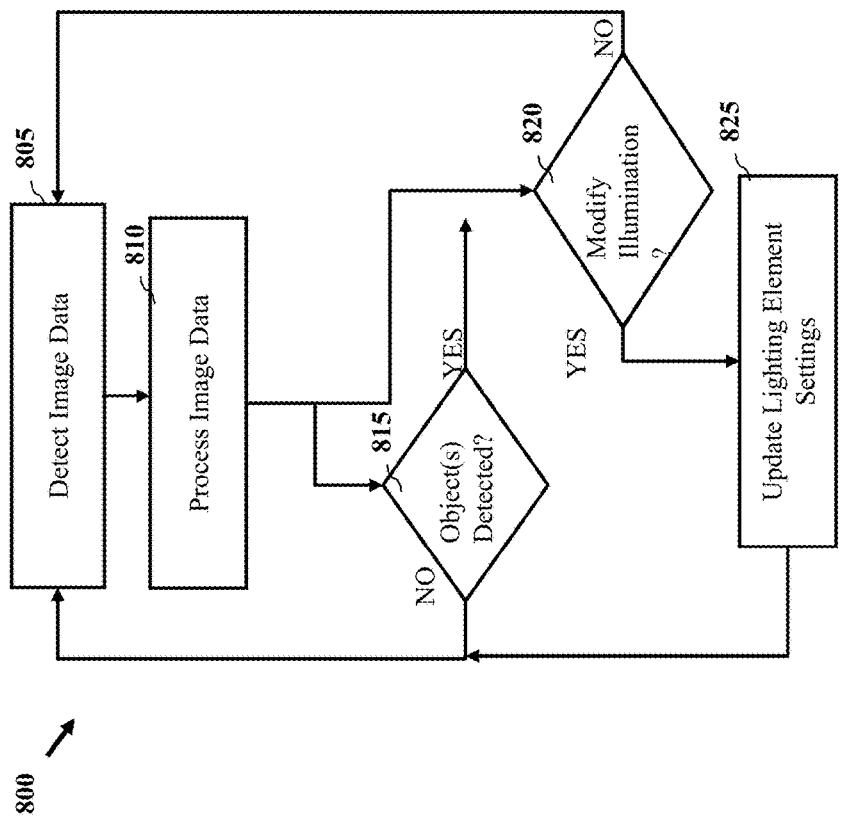
FIG. 8 depicts a flow diagram of lighting element control according to one or more embodiments.

FIG. 8 depicts a flow diagram of lighting element control according to one or more embodiments. Process 800 may be initiated by detecting image data at block 805. At block 810, image data is processed to identify one or more objects.

Processing at block 810 may include one or more of image analysis and deep learning processes, such as process 700, to identify objects. At decision block 815, process 800 determines whether any objects are detected. When no objects are detected (e.g., "NO" path out of decision block 815), process 800 continues to detect image data at block 805. When one or more objects are detected (e.g., "YES" path out of decision block 815), process 800 determines whether to modify illumination output at decision block 820. When illumination is not to be modified (e.g., "NO" path out of decision block 820), process 800 continues to detect image data at block 805. When illumination is to be modified (e.g., "YES" path out of decision block 820), process 800 updates one or more lighting element settings at block 825.

Figure 9:
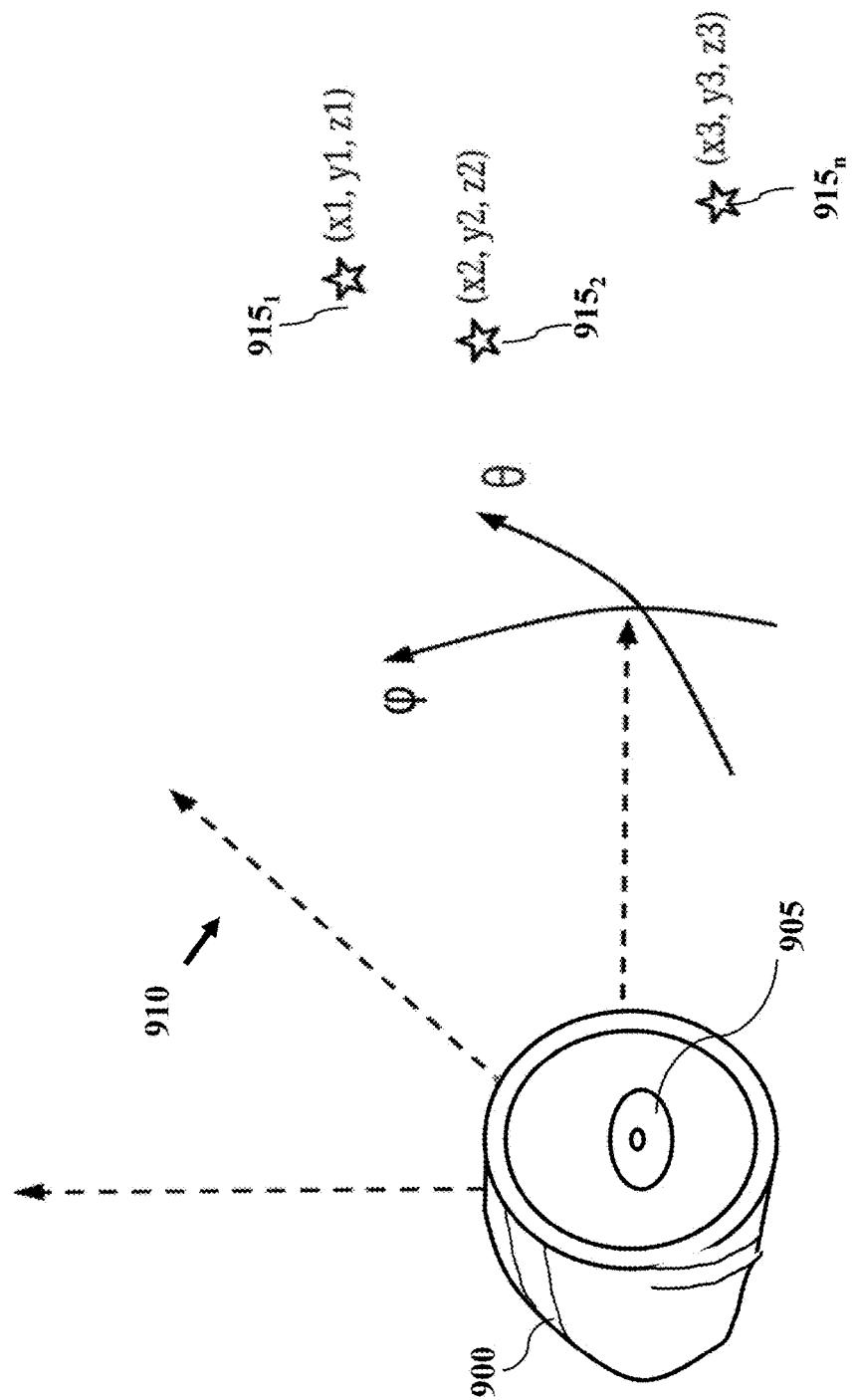
FIG. 9 depicts a graphical representation of headlight control according to one or more embodiments.

FIG. 9 depicts a graphical representation of headlight control according to one or more embodiments. According to one embodiment, one or more lighting elements of the vehicle may be directed such that the lighting elements may be physically directed in one or more directions. FIG. 9 depicts lighting element 900 including illumination source 905. Lighting element 900 is depicted as a head lamp in FIG. 9, however, the principles discussed below may be applied to movable elements within a lighting output and other vehicle lighting configurations.

Lighting element 900 may be configured to have two degrees of freedom-horizontal orientation ($\theta$) and vertical orientation ($\varphi$) to output a beam in space, shown generally as 910. FIG. 9 also depicts objects of interest $915_{1-n}$ in the view-field of a front facing vehicle camera. Real-world coordinates of objects $915_{1-n}$ with respect to a vehicles frame of reference are indicated in FIG. 9 as (xi, yi, zi). Objects $915_{1-n}$ and their spatial location can detected by an image processing unit described herein.

According to one embodiment, based on the orientation of lighting element 900, different objects in the scene will be illuminated to different levels L (xi, yi, zi; $\theta$, $\varphi$). According to another embodiment, lighting element 900 may be positioned by a control unit such that the objects of high importance (e.g., pedestrians, cyclists and other vehicles) are made clearly visible. The importance of each object in the scene—P ($obj_i$) is estimated by the AI system based on its visual characteristics. At the optimal position of lighting element 900, the overall illumination of the important objects in the scene is maximized. Such an optimal position ($\theta^*$, $\varphi^*$) can obtained by optimizing the following objective function:

$$(\theta*, \varphi*) = \mathrm{argmax}(\theta, \varphi) \sum_i L(xi, yi, zi; \theta, \varphi) * P(obj_i)$$

Optimization of the above objective function can be carried out using fast iterative methods such as gradient descent to estimate the orientation for lighting element 900.

While this disclosure has been particularly shown and described with references to exemplary embodiments thereof, it will be understood by those skilled in the art that various changes in form and details may be made therein without departing from the scope of the claimed embodiments.

What is claimed is:

1. A method for vehicle headlight control, the method comprising:
   receiving, by a control unit, image data from a front facing camera of a vehicle;
   detecting, by a control unit, at least one object in the image data, wherein object detection includes determining object position;
   detecting, by the control unit, an illumination level of the at least one object in the image data, wherein the illumination level relates to object brightness in the image data;
   determining, by the control unit, a control setting to modify illumination of at least one lighting element of the vehicle, wherein the control setting is determined to increase an illumination level for the at least one object based on object position to increase brightness of a selection of captured image data; and
   controlling, by the control unit, the at least one lighting element of the vehicle in response to the control setting, wherein controlling includes adjusting a beam pattern of the at least one lighting element of the vehicle.

2. The method of claim 1, wherein the image data is video data captured for a scene associated with the direction of travel of the vehicle.

3. The method of claim 1, wherein the at least one object includes one or more of a pedestrian, vehicle, barrier, person, roadway hazard, and roadway object.

4. The method of claim 1, wherein the illumination level relates to one or more of brightness and light distribution.

5. The method of claim 1, wherein wherein object detection includes determining object position in three dimensional space with respect to distance from the front facing camera of a vehicle.

6. The method of claim 1, wherein the control setting modifies the angular position and direction of the at least one lighting element.

7. The method of claim 1, wherein the control setting modifies brightness and illumination activation of the at least one lighting element to increase illumination levels for a plurality of objects such that overall illumination of important objects are maximized.

8. The method of claim 1, wherein controlling the at least one lighting element of the vehicle is based on a detection area of the front facing camera, such that sections of the image data are associated with preconfigured lighting element settings.

9. The method of claim 1, wherein controlling includes activation of one or more illumination sources of vehicle lighting elements.

10. The method of claim 1, wherein the control setting relates to illumination of a section of captured image data and controlling includes control of one or more vehicle lighting elements to increase brightness for the section of captured image data.

11. A vehicle comprising:
   a plurality of lighting elements;
   a front facing camera; and
   a control unit for the plurality of lighting elements, the control unit configured to
      receive image data from the front facing camera of the vehicle;
      detect at least one object in the image data, wherein detection includes determining object position;
      detect an illumination level of the at least one object in the image data, wherein the illumination level relates to object brightness in the image data;
      determine a control setting to modify the illumination output for at least one lighting element of the vehicle, wherein the control setting is determined to increase an illumination level for the at least one object based on object position to increase brightness of a selection of captured image data; and control the at least one lighting element of the vehicle in response to the control setting, wherein controlling includes adjusting a beam pattern of the at least one lighting element of the vehicle.

12. The vehicle of claim 11, wherein the image data is video data captured for a scene associated with the direction of travel of the vehicle.

13. The vehicle of claim 11, wherein the at least one object includes one or more of a pedestrian, vehicle, barrier, person, roadway hazard, and roadway object.

14. The vehicle of claim 11, wherein the illumination level relates to one or more of brightness and light distribution.

15. The vehicle of claim 11, wherein wherein object detection includes determining object position in three dimensional space with respect to distance from the front facing camera of a vehicle.

16. The vehicle of claim 11, wherein the control setting modifies the angular position and direction of the at least one lighting element.

17. The vehicle of claim 11, wherein the control setting modifies brightness and illumination activation of the at least one lighting element to increase illumination levels for a plurality of objects such that overall illumination of important objects are maximized.

18. The vehicle of claim 11, wherein control of the at least one lighting element of the vehicle is based on a detection area of the front facing camera, such that sections of the image data are associated with preconfigured lighting element settings.

19. The vehicle of claim 11, wherein control includes activation of one or more illumination sources of vehicle lighting elements.

20. The vehicle of claim 11, wherein control in response to the control setting relates to illumination of a section of captured image data and control includes control of one or more vehicle lighting elements to increase brightness for the section of captured image data.

* * * * *